United States Patent [19]

Howard et al.

[11] 4,269,211
[45] May 26, 1981

[54] STEAM MANIFOLD DISTRIBUTION SYSTEM FOR PROVIDING EQUAL QUALITY OF STEAM IN TWO LINES

[75] Inventors: Curtis E. Howard, Porter; Douglas G. Calvin, Missouri City, both of Tex.

[73] Assignee: Texaco Inc., White Plains, N.Y.

[21] Appl. No.: 9,196

[22] Filed: Feb. 5, 1979

[51] Int. Cl.³ .................... G05D 11/02; G05D 11/08
[52] U.S. Cl. ........................................ 137/2; 137/118; 137/559; 137/876
[58] Field of Search ............... 137/118, 872, 875, 876, 137/559, 2; 122/406 B, DIG. 3, DIG. 4; 237/9 R; 166/305 R, 306, 272, 303; 55/18, 210, 465; 138/39, 44, 37

[56] References Cited

U.S. PATENT DOCUMENTS

| | | | |
|---|---|---|---|
| 354,730 | 12/1886 | Newton | 55/465 |
| 2,404,996 | 7/1946 | Thrush | 137/875 |
| 2,992,814 | 7/1961 | Maher | 55/465 |
| 3,221,541 | 12/1965 | Osborne | 73/53 |
| 3,270,775 | 9/1966 | Alderson | 137/875 |
| 3,406,563 | 10/1968 | Ciarlariello | 73/29 |
| 4,034,597 | 7/1977 | Fredriksson | 73/29 |
| 4,131,131 | 12/1978 | Frisch | 137/559 |

Primary Examiner—Gerald Goldberg
Assistant Examiner—Denis E. Corr
Attorney, Agent, or Firm—Carl G. Ries; Robert A. Kulason; Theron H. Nichols

[57] ABSTRACT

A method for equalizing the steam quality in a plurality of branch lines of a high pressure steam pipeline, as a tee joint comprises dividing the flow of steam entering the tee joint into the two branch lines with a perforated baffle plate rotatable in response to a steam quality determining means in each branch line. A steam manifold distribution system is disclosed including a mechanism for retracting a perforated baffle plate into a pressure equalizer chamber for removal, repair, or replacement of the baffle plate. The pressure equalizer chamber may be positioned on and fixedly attached to the tee joint in the field in any position between co-axial with one of the branch lines of the tee joint and perpendicular thereto. A new method for assembly of a steam manifold distribution system is likewise disclosed.

15 Claims, 5 Drawing Figures

STEAM MANIFOLD DISTRIBUTION SYSTEM FOR PROVIDING EQUAL QUALITY OF STEAM IN TWO LINES

BACKGROUND OF THE INVENTION

One typical use of the disclosed invention is in steam flooding operations for secondary recovery of additional oil sealed up in the ground around oil wells that produce no more free flowing oil, the hotter the steam vapor, the more oil is recoverable. In long manifold steam distribution systems, very often only hot water reaches the end of some steam lines instead of high quality steam. Thus, if the steam quality were balanced through all branch lines, the efficiency of the entire system would be improved. The below disclosed invention solves that very problem.

In greater detail of the problem, as steam passes through a manifold system, liquid droplets will tend to condense or form, and they will tend to separate from the gaseous steam disproportionately at branch points or intersections and thus the steam quality changes throughout the manifold system.

OBJECTS OF THE INVENTION

Accordingly, a primary object of this invention is to provide a method for equalizing the steam quality in a plurality of branch lines of a high pressure steam pipeline.

Another primary object of this invention is to provide a steam quality baffle system in a manifold distribution system for equalizing the quality of steam in all steam outlet branch pipes.

A still further object of the invention is to provide a method for forming or assembling a steam quality equalizing baffle system for equalizing the quality of steam in at least two outlet pipes from a steam pipe tee joint.

A further object of this invention is to provide a mechanism for equalizing the steam quality from a steam pipe tee joint that is easy to operate, is of simple configuration, is economical to build and assemble, and is of greater efficiency.

Other objects and various advantages of the disclosed method for equalizing the steam quality in two branch lines or a high pressure steam pipe tee, a steam quality baffle system, and a method for assembling a steam quality equalizing baffle system for equalizing the quality of steam from two outlet pipes, from a steam pipe tee joint will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWING(S)

The drawings diagrammatically illustrate by way of example, not by way of limitation, one form of the invention wherein like reference numerals designate corresponding parts in the several views in which.

Figure 1:
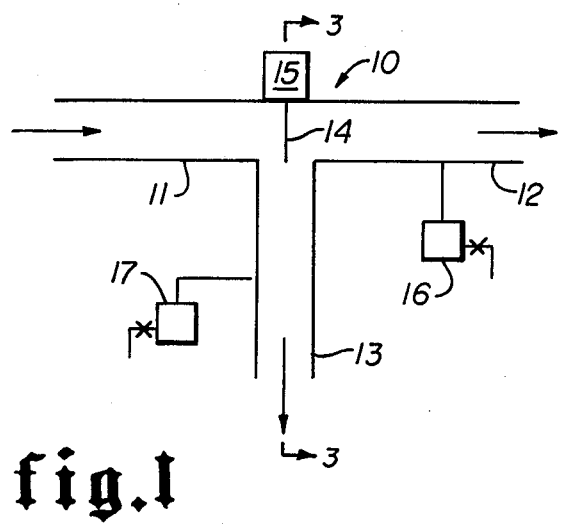
FIG. 1 is a schematic diagrammatic vertical sectional view of the equalizing steam quality system with the retractable perforated baffle plate being illustrated extended into the high pressure steam flow.

The invention disclosed herein, the scope of which being defined in the appended claims is not limited in its application to the details of construction and arrangement of parts shown and described, since the invention is capable of other embodiments and of being practiced or carried out in various other ways. Also, it is to be understood that the phraseology or terminology employed here is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE INVENTIONS

This patent includes three inventions, a method for equalizing the steam quality in a plurality of branch lines or a high pressure steam pipeline, a steam quality baffle system for practicing the above method, and a method for assembling a steam quality equalizing baffle system for equalizing the quality of steam in at least two outlet pipes from a steam pipe tee joint.

METHOD FOR EQUALIZING STEAM QUALITY IN TWO BRANCH LINES

FIGS. 1–5 show a conventional tee joint 10 in a high pressure steam pipeline, the tee joint having a main inlet pipeline 11, a main outlet pipeline 12, and a branch outlet pipeline 13. The basic method step of equalizing the steam quality in the two branch lines of the high pressure steam pipeline tee is to divide the flow of the steam entering the tee joint into the two branch lines with a perforated baffle plate 14 rotatable in response to a steam quality determining means 16 and 17 in each branch line 12 and 13, respectively.

Another method in greater detail comprises (1) rotating the perforated baffle plate 14 in the middle of the steam pipeline tee 10 to a position between a position parallel to the main outlet pipeline 12 and a position perpendicular to the main outlet pipeline, (a) responsive to the steam quality determining means 16 in the main outlet pipe 12, and (b) responsive to the steam quality determining means 17 in the branch outlet pipeline 13 for equalizing the quality of steam in both of the outlet pipes.

A more detailed method wherein the steam pipe tee has a pressure chamber 15 positioned thereon over the perforated baffle plate 14 comprises the following steps in addition to the method above, (2) positioning the pressure equalizer chamber on the steam pipe tee joint on any position between one coaxial with the branch outlet pipe and one normal to the branch outlet pipe, (3) equalizing the pressure in the pressure equalizer chamber 15 to that of the high pressure steam main outlet pipe 12 by operation of a pressure equalizer valve 38, (4) retracting the perforated baffle plate 14 through a slot into the pressure equalizer chamber, (5) actuating a valve 24 in the slot for sealing the chamber from the high pressure steam pipe, (6) venting the high pressure steam from the pressure equalizer chamber to atmospheric pressure, and (7) opening closure means 36 on the pressure equalizer chamber for removal and overhaul and/or replacement of the perforated baffle plate.

THE PREFERRED EMBODIMENT FOR PRACTICING THE INVENTION

The above methods for equalizing the steam quality in two branch lines or a high pressure steam pipeline tee joint may be performed by other mechanisms than that disclosed in the FIGURES. The mechanism disclosed herein may be operated by other methods than those disclosed, as by hand. Also the disclosed mechanism can be used to practice another and materially different method. However, the preferred system is disclosed in FIGS. 3 and 4, particularly.

Figure 2:
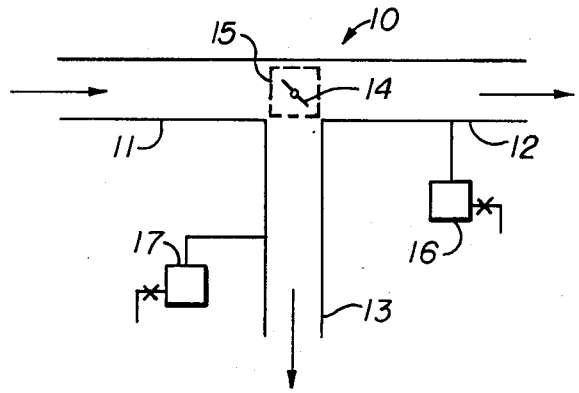
FIG. 2 is a view similar to FIG. 1 showing the pressure equalizer chamber having been rotated 90° around behind the tee joint prior to being welded thereto and the perforated baffle plate being extended into the tee joint and rotated 45°.

FIGS. 1 and 2 illustrate schematically a vertical section of the high pressure steam pipe tee joint 10 having a high pressure steam inlet pipe 11 for distributing high pressure steam to a main outlet pipe 12 and a branch outlet pipe 13. The means for distributing the steam to the two outlet pipes 12 and 13 is a rotatable perforated baffle plate 14 extendable from a pressure equalizer chamber 15, FIGS. 1 and 2, into the tee joint 10. A conventional steam quality determining means 16 is mounted in a wall of the main outlet pipe 12 and a similar steam quality determining means 17 is mounted in a wall of the branch outlet 13 for providing the steam quality in their respective outlet pipes. After perforated baffle plate 14 is extended into the steam pipe tee joint 10, then from the above steam quality information, the perforated baffle plate 14 is rotated about its axis, as shown in FIG. 2, for equalizing the steam quality in both outlet pipes of the tee.

An important feature of this steam manifold distribution system is that the pressure equalizer chamber 15 may be mounted on the steam pipe tee 10 at various angles and positions, i.e. from any position between a position co-axial with one of the branch outlet pipes, as illustrated in FIG. 1, to a position normal to the branch outlet pipe as illustrated in FIG. 2.

Figure 3:
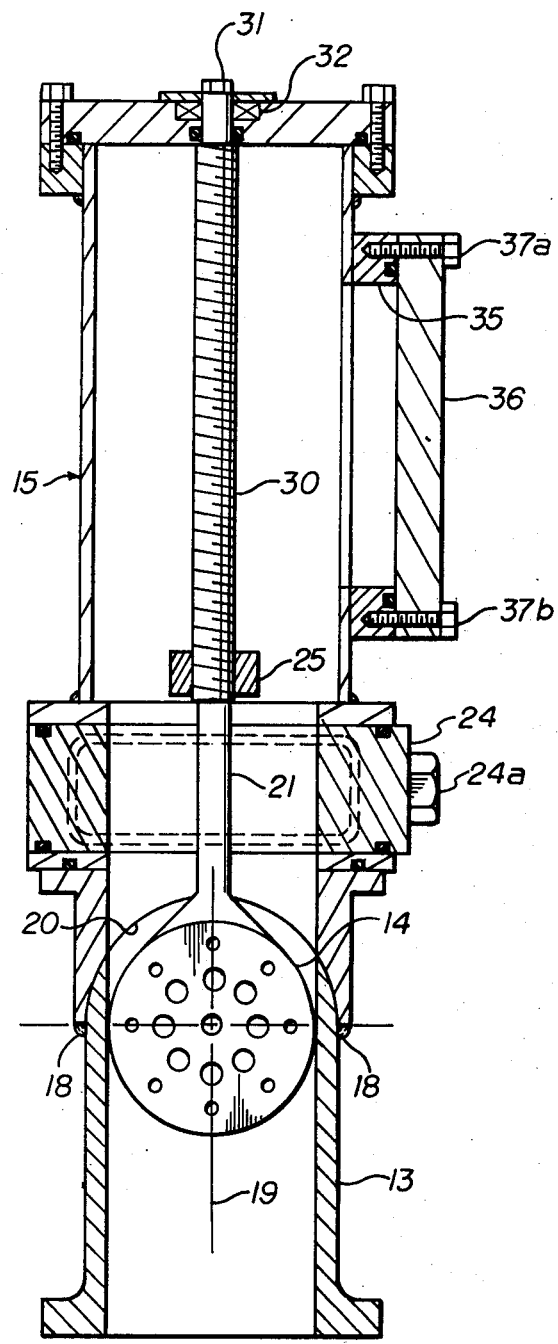
FIG. 3 is a schematic detailed vertical section taken at 3—3 on FIG. 1 of the steam quality equalizing system just after extension of the perforated baffle plate into the steam flow line from retracted position in a pressure equalizer chamber.
Figure 4:
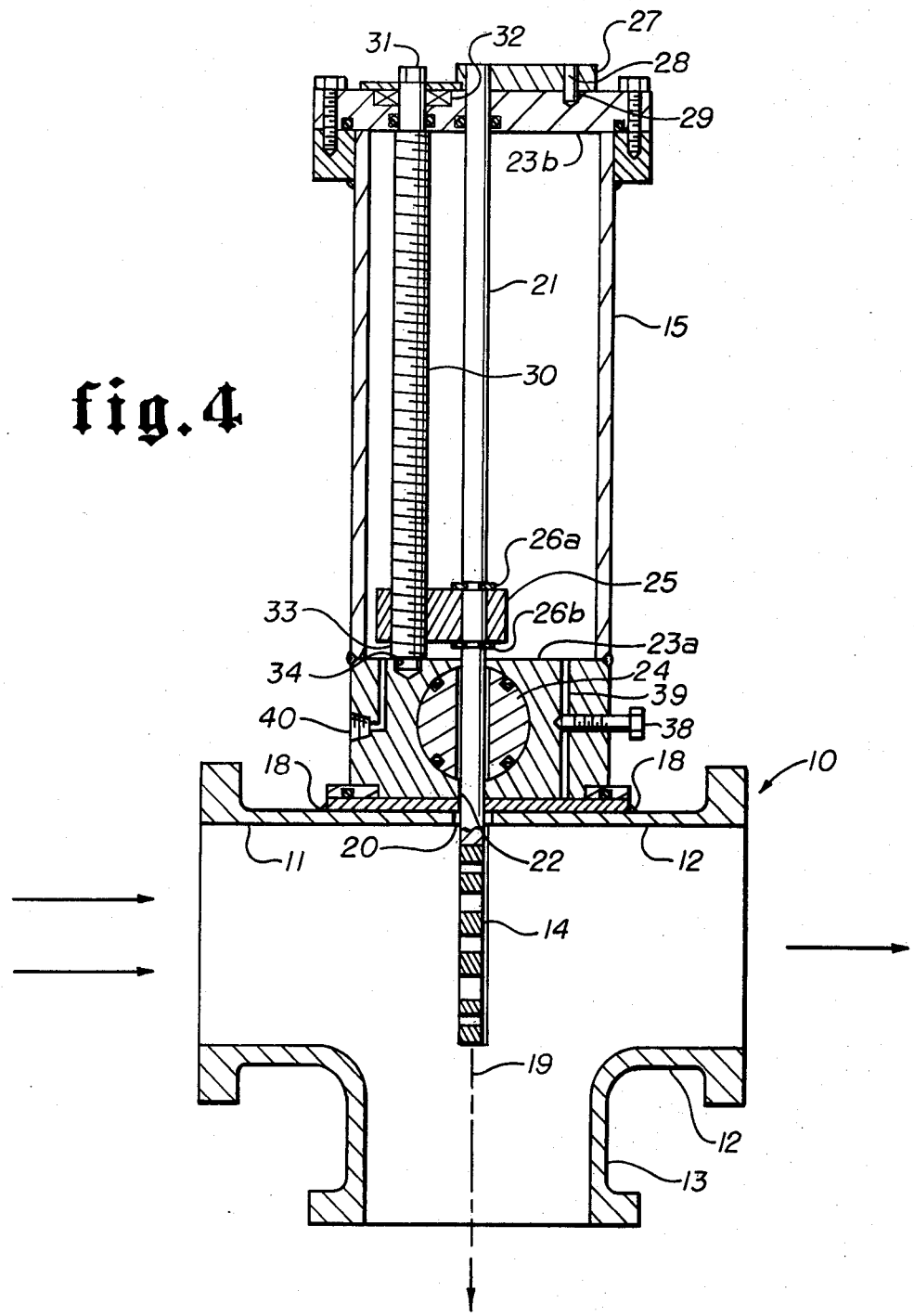
FIG. 4 is a schematic detailed view of FIG. 1 or a side view of FIG. 3.
Figure 5:
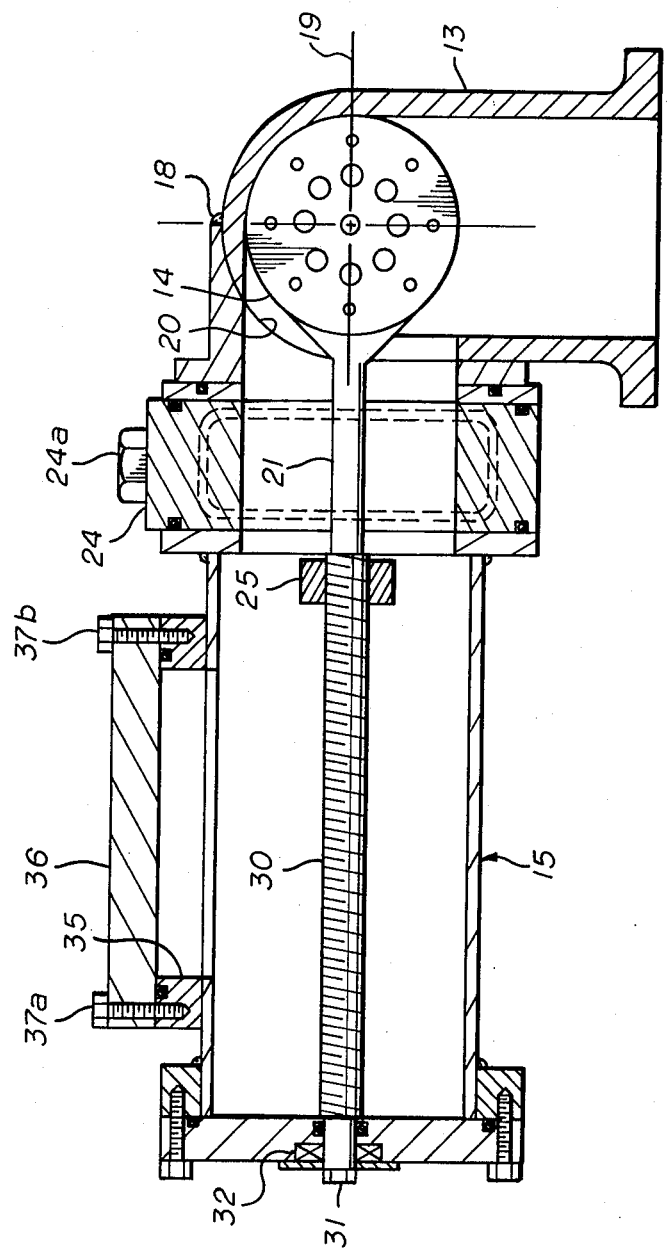
FIG. 5 is a schematic detailed view of FIG. 2 with the pressure equalizer chamber rotated 90° beyond the position illustrated in FIGS. 3 and 4, on the tee joint prior to being welded thereto.

FIGS. 3, 4, and 5 disclose more details of the steam manifold distribution system.

FIG. 4, a detailed view of FIG. 1 or a side view of FIG. 3, show the high pressure pipeline tee joint 10 with the pressure equalizer chamber 15 positioned on the tee and fixedly secured thereto, as with an endless weld 18 with the axis of rotation 19 of the perforated baffle plate 14 being co-axial or at least parallel to the longitudinal axis of the middle or branch outlet line 13. Prior to positioning the pressure equalizer chamber on the tee joint, a slot 20 is cut therein to permit the perforated baffle plate to extend therethrough into the tee joint for rotation thereafter.

In FIG. 4, rotation of the perforated baffle plate 14 is accomplished as follows: an elongated shaft 21, FIG. 4, extends up from the perforated baffle plate 14 for passing freely up through slot 20 in tee joint 10, up through at slot 22 in the thick bottom 23a of the pressure equalizer chamber 15 and a rotatable, cylindrical seal or valve 24 therein, up through a threaded traveling block 25 held with retaining rings 26a, 26b, thereon the shaft, and up through the top cover 23b of the chamber 15 to protrude through adjusting angle of baffle plate orientation handle 27 fixedly secured to the shaft 21 with a set screw or the like. Handle 27 is rotatable through at least 90° from the position illustrated, and locked in any position in-between the two extreme positions with spring biased locking pin 28 insertable in an arc of holes 29 on the top cover 23b for adjusting the perforated baffle plate rotatable about shaft axis 19 in any position between one normal to the main inlet and main outlet pipelines 11, 12 and one parallel to the main inlet and main outlet pipelines for insuring equal steam quality in the two outlet pipelines 12 and 13.

Valve 24 is rotatable to open or closed position with a wrench or the like on valve projection 24a.

A mechanism for retracting the perforated baffle plate 14, FIGS. 3 and 4, into the pressure equalizer chamber comprises a threaded shaft 30 parallel to baffle plate shaft 21 with a headed upper end 31 protruding up through the pressure equalizer chamber cover 23b and bearing 32 therein, and with a lower end 33 protruding in a recess 34 in the pressure equalizer chamber thick bottom 23a. The traveling block 25, which is rotatably secured to baffle plate shaft 21 with the retaining rings 26a, 26b, is threaded on the retracting threaded shaft 30.

The pressure equalizing chamber 15, FIG. 3, has an opening 35 for the removal, work on, and/or replacement of the perforated baffle plate 14. An inspection plate 36 is secured, as with bolts 37a–37b over the opening 35. Pressure equalizer chamber thick bottom 23a, FIG. 4, has a pressure equalizer valve 38 in orifice 39 for equalizing the gas pressure between the tee joint 10 and the pressure equalizer chamber. Further, a pressure relief valve 40 is mounted in the pressure equalizer chamber thick bottom 23a for reducing the gas pressure in the pressure equalizer chamber when desired, as down to atmospheric pressure subsequent to closing of valves 24 and 38 and prior to opening of the inspection plate 36.

The perforated baffle plate 14 may be made in various shapes and sizes with various hole patterns to produce a minimum pressure drop. Generally, the hole pattern should have large holes in the center and small holes at the edges for effectively turning liquid in the steam as the gaseous phase is more predominate in the center of the steam pipe. Thus the quality of the steam is better equalized in the two outlet steam pipelines.

Briefly in operation of the steam quality equalizing baffle system for equal manifold distribution of high pressure steam flood operations for example, upon injection of high pressure steam into the main inlet pipeline 11, FIG. 2, of a tee joint 10, steam of equal quality is distributed to both the main outlet pipeline 12 and the branch outlet pipeline 13 by rotation of the perforated baffle plate about its shafts axis responsive to the two steam quality determining means 16, 17 in the respective outlet pipelines 12 and 13. The pressure equalizer chamber containing the rotatable perforated baffle plate is formed so that it may be mounted on the tee joint in the field any where between a position with its axis of rotation being parallel to the branch outlet pipeline longitudinal axis (FIG. 1) and a position with its axis of rotation being perpendicular to the breach outlet pipeline longitudinal axis (FIG. 2).

In greater detail, upon injection of high pressure steam into the main inlet pipeline 11, FIG. 4, of the tee joint 10, the perforated baffle plate 14 stored in its retracted position in the pressure equalizer chamber is extended through slot 22 in thick bottom 23a and slot 20 in the wall of the tee joint into the center of the tee joint 10 by rotation of shaft 30 with a wrench or other suitable means on the shaft upper end 31 for lowering the traveling block 25 and the baffle plate and shaft, 14 and 21, respectively, connected thereto.

Once extended into the tee joint and the slot 22 closed by rotation of valve 24, the perforated baffle plate 14, FIG. 4, is rotated in one direction or the other about its axis of rotation or shaft longitudinal axis 19 as indicated or dictated by the readings from each of the steam quality determining means 16 and 17, FIG. 2, in the respective two outlet pipelines 12 and 13 until the steam quality is equal in both outlet pipelines. The perforated baffle plate is rotatably adjusted by turning of the baffle plate orientation handle 27 and held in the desired angular position with spring biased locking pin 28.

After the quality of the high pressure steam flow into the tee joint to the two outlet pipelines is no longer required, or for other reasons, retraction of the perforated baffle plate may be desired. First, the perforated baffle is rotated back with handle 27 until in alignment with the slot 20 in the tee joint. Then a wrench or a handle may be placed over the retracting shaft upper end 31, FIG. 4, and the retracting shaft 30 rotated for raising traveling block 25 and accordingly retracting the perforated baffle plate 14 through the slots in the tee joint, pressure equalizer chamber bottom 23a, and the valve 24 into the pressure equalizer chamber 15. After the valves 24 and 38 are sealed shut and the pressure relief valve 40 opened to the atmosphere, the inspection plate 36, FIG. 3, is opened and the baffle plate removed for inspection and repair or replacement prior to insertion back into the pressure equalizer chamber for extension with the tee joint in the reverse operation of events. That is, the pressure relief valve 40 is closed, the pressure equalizer valve 24 rotated to align its slot with slots 22 of the chamber bottom and 20 of the tee joint so that the perforated baffle plate 14 may be extended into the high pressure steam tee joint 10.

MODIFICATION

While the perforated baffle plate rotatable shaft 21, FIG. 4, is described here as being manually rotated in one direction or the other direction as indicated by the readings of the steam quality determining means 16 and 17 in each of the respective outlet pipelines 12 and 13, a more sophisticated drive system may be utilized. It would comprise a conventional electric drive system for driving a reversible servo motor, for example, (not shown), connected to and responsive to the two steam quality determining means 16 and 17, FIGS. 1 and 2, for rotating the perforated baffle plate shaft 21 and accordingly the preferred baffle plate 14 to the angular position providing steam of equal quality in the two steam outlet pipelines 12 and 13.

METHOD FOR ASSEMBLING A STEAM QUALITY EQUALIZER BAFFLE SYSTEM

The above mechanism for equalizing the steam quality in two branch lines of a high pressure steam pipe tee joint may be assembled by various methods. However, the preferred method for assembling the steam quality equalizing baffle system may comprise the following method steps:

(1) rotatably mounting a perforated baffle plate (14) in the high pressure steam pipe tee joint (10) having two outlets, and (2) connecting a separate steam quality determining means (16) and (17), FIG. 2, to each of the outlet pipes (12,13) so that the perforated baffle plate is rotatable responsive to both the steam quality determining means to a position equalizing the quality of steam in both of the outlet pipes.

Step (1) of the above basic method may be broken down into more detailed steps as follows:

(1) rotatably mounting a perforated baffle plate (14) in the high pressure steam pipe tee joint (10) having two outlets, and (2) connecting a separate steam quality determining means (16) and (17), FIG. 2, to each of the outlet pipes (12, 13) so that the perforated baffle plate is rotatable responsive to both the steam quality determining means to a position equalizing the quality of steam in both of the outlet pipes.

Step (1) of the above basic method may be broken down into more detailed steps as follows:

(1a) fixedly mounting the pressure equalizer chamber (15) on the high pressure steam pipe tee joint over the perforated baffle plate (14), and (1b) rotatably mounting an elongated perforated baffle plate shaft (21) in the pressure equalizer chamber for positioning the perforated baffle plate at the proper angle for equalizing the quality of steam in both of the outlet pipes.

Step (1) of the above basic method may be broken down into the followed detailed steps:

(1a) fixedly mounting a pressure equalizer chamber (15) on the high pressure steam pipe tee joint (10) over the perforated baffle plate positioned anywhere between a position co-axial with one branch outlet pipe and normal to that branch outlet pipe, and (1b) connecting a retracting means (25, 30) to the perforated baffle plate (14) for retraction thereof out of the high pressure steam pipe tee joint into the pressure equalizer chamber for subsequent work on the perforated baffle plate.

The following four steps (1c–1f) may be added to the above two steps (1a and 1b) for forming a more detailed basic step one:

(1c) forming a slot 20 in the high pressure steam pipe tee joint (10) over the perforated baffle plate, (1d) forming a slot (22) in the portion of the pressure equalizer chamber contiguous with the other slot for passage of the perforated baffle plate therethrough, (1e) mounting a valve (24) in the second slot (22) for sealing the slot closed after retraction of the perforated baffle plate therethrough into the pressure equalizer chamber, and (1f) forming opening means (35, 36, 37) in the pressure equalizer chamber for removal and work on the perforated baffle plate.

Step (1) of the above basic method may be broken down still further into more detailed steps as follows:

(1a) fixedly mounting a pressure equalizer chamber (15) on the high pressure steam pipe tee joint (10) over the perforated baffle plate (14) between a position co-axial with one of the branch outlet pipes and normal to the one branch outlet pipe, (1b) rotatably mounting an elongated perforated baffle plate shaft (21) in the pressure equalizer chamber for positioning the perforated baffle plate for equalizing the quality of steam in both of the outlet pipes, (1c) rotatably mounting a threaded shaft (30) in the pressure equalizer chamber adjacent to the perforated baffle plate shaft, and (1d) connecting the threaded shaft to the perforated baffle plate shaft with a connecting traveling block (25) for retracting the perforated baffle plate from the high pressure steam pipe tee joint into the pressure equalizer chamber by rotation of the threaded shaft in one direction, and for extending the perforated baffle plate by rotation of the threaded shaft in the other direction.

Obviously other methods for forming or assembling a steam quality baffle system on a high pressure steam pipe tee and other methods may be utilized for equalizing the steam quality in two branch lines of a high pressure steam pipe tee joint with the embodiments of FIGS. 1–5 than those listed above, depending on the particular information desired.

Accordingly, it will be seen that the above described methods for equalizing the steam quality in two branch lines of a high pressure steam pipe tee joint, a particular steam quality baffle sysem, and methods for forming or assembling a steam quality equalizing baffle system will operate in a manner which meets each of the objects set forth hereinbefore.

While only few methods of the invention and one mechanism for carrying out the methods have been disclosed, it will be evident that various other methods and modifications are possible in the arrangement and construction of the disclosed steam quality equalizing baffle system on a high pressure steam pipe tee without departing from the scope of the invention and it is accordingly desired to comprehend within the purview of this invention such modifications as may be considered to fall within the scope of the appended claims.

We claim:

1. A method for equalizing the steam quality in two branch lines of a high pressure steam pipe tee joint with a perforated baffle plate rotatably pivoted in said tee joint comprising the steps of;
   (a) dividing the flow of the steam entering the tee joint into said two branch lines,
   (b) determining the steam quality in each branch line, and,
   (c) rotating said baffle plate in accordance with the determined steam quality in each branch line.

2. A method for equalizing manifold distribution or high pressure steam in a steam pipe tee having a main inlet pipe and two branch outlet pipes with a rotatable baffle plate in said tee and with steam quality determining means in each of said outlet pipes in steam flood well operations comprising the steps of,
   (a) injecting high pressure steam into the main inlet pipe of the steam pipe tee,
   (b) dividing the flow of high pressure steam with said rotatable perforated baffle plate to the two branch outlet pipes, and
   (c) maintaining the steam quality in both branch outlet pipes equal to each other by adjusting said rotatable perforated baffle plate responsive to said steam quality determining means in each of the two branch outlet pipes.

3. A method for equalizing manifold distribution of high pressure steam flowing into the main entrance line of a steam pipe tee having two branch outlet pipes in steam flood well operations wherein the high pressure steam pipe system has a perforated baffle plate and two steam quality determining means therein the branch outlet pipes comprising the steps of,
   (a) determining the steam quality in both the branch outlet pipes
   (b) rotating the perforated baffle plate in the middle of the steam pipe tee to a position between a position parallel to one of the branch outlet pipes and a position perpendicular to the one branch outlet pipe in accordance with the steam quality determining step for equalizing the quality of steam in both of the outlet pipes.

4. A method for equalizing manifold distribution of high pressure steam flowing into the main entrance line of a steam pipe tee having two branch outlet pipes in a steam flood well operations wherein the high pressure steam pipe system has a perforated baffle plate and two steam quality determining means therein the branch outlet pipes and wherein the steam pipe tee joint has a pressure equalizer chamber thereon with the perforated baffle plate retractable internally thereof comprising the steps of,
   (a) rotating the perforated baffle plate in the middle of the steam pipe tee to a position between a position parallel to one of the branch outlet pipes and a position perpendicular to the one branch outlet pipe responsive to a steam quality determining means in each of the branch outlet pipes for equalizing the quality of steam in both of the outlet pipes,
   (b) equalizing the pressure in the pressure equalizer chamber to that of the steam pipe tee joint, and
   (c) extending the perforated baffle plate from within the pressure equalizer chamber into the steam pipe tee for rotation thereof for equalizing the quality of steam in both of the outlet pipes.

5. A method for equalizing manifold distribution of high pressure steam flowing into the main entrance line of a steam pipe tee having two branch outlet pipes in steam flood well operations wherein the high pressure steam pipe system has a perforated baffle plate and two steam quality determining means therein the branch outlet pipes and wherein the steam pipe tee joint has a pressure equalizer chamber thereon comprises the steps of,
   (a) rotating the perforated baffle plate in the middle of the steam pipe tee to a position between a position parallel to one of the branch outlet pipes and a position perpendicular to the one branch outlet pipe responsive to a steam quality determining means in each of the branch outlet pipes for equalizing the quality of steam in both of the outlet pipes,
   (b) positioning the pressure equalizer chamber on the steam pipe tee joint on any position between one co-axial with one of the branch outlet pipes and one normal to the one branch outlet pipe,
   (c) equalizing the pressure in the pressure equalizer chamber to that of the steam pipe tee join by operation of a pressure equalizer valve,
   (d) retracting the perforated baffle plate through a slot into the pressure equalizer chamber,
   (e) actuating a valve in the slot for sealing the chamber from the high pressure steam pipe,
   (f) venting the high pressure steam from the pressure equalizer chamber, and
   (g) opening closure means on the pressure equalizer chamber for removal, work on, and/or replacement of the perforated baffle plate.

6. A steam quality equalizing baffle system for equal manifold distribution of high pressure steam in steam flood operations comprising,
   (a) perforated baffle plate means rotatably mounted internally of a steam pipe tee joint for receiving high pressure steam entering a main inlet pipe of the tee joint for being divided into two branch outlet pipes,
   (b) steam quality determining means for each of said outlet pipes, and
   (c) said perforated baffle plate means being rotatable between a position parallel to one of said branch outlet pipes and a position perpendicular to said one outlet pipe responsive to both said steam quality determining means for equalizing the quality of steam in both of said steam outlet pipes.

7. A steam quality equalizing baffle system for equal manifold distribution of high pressure steam in steam flood operations comprising,
   (a) perforated baffle plate means rotatably mounted internally of a steam pipe tee joint for receiving high pressure steam entering a main inlet pipe of the tee joint for being divided into two branch outlet pipes,
   (b) steam quality determining means for each of said outlet pipes,
   (c) said perforated baffle plate means being rotatable between a position parallel to one of said branch outlet pipes and a position perpendicular to said one outlet pipe responsive to both said steam quality determining means for equalizing the quality of steam in both of said steam outlet pipes,
   (d) pressure equalizer chamber means for said steam pipe tee joint having a pressure equalizer valve means for equalizing the high pressure steam between said steam tee joint and said pressure equalizer chamber,
   (e) baffle retracting means on said pressure equalizer chamber means, and
   (f) said perforated baffle plate means being responsive to said baffle retracting means for being retracted completely out of said steam pipe tee joint into said pressure equalizer chamber means.

8. A steam quality equalizing baffle system for equal manifold distribution of high pressure steam in steam flood operations comprising,
   (a) perforated baffle plate means rotatably mounted internally of a steam pipe tee joint for receiving high pressure steam entering a main inlet pipe of the tee joint for being divided into two branch outlet pipes,
   (b) steam quality determining means for each of said outlet pipes,
   (c) said perforated baffle plate means being rotatable between a position parallel to one of said branch outlet pipes and a position perpendicular to said one outlet pipe responsive to both said steam quality determining means for equalizing the quality of steam in both of said steam outlet pipes,
   (d) pressure equalizer valve means between said steam tee joint and a pressure equalizer chamber means for equalizing the steam pressure between the two,
   (e) a passage between said pressure equalizer chamber means and said steam tee joint for retracting said perforated baffle plate means through from said steam tee joint into said pressure equalizer chamber means,
   (f) valve means for closing said passage after said perforated baffle plate means is retracted into said pressure equalizer chamber,
   (g) pressure relief means for said pressure equalizer chamber means for lowering the pressure in said pressure equalizer chamber means to atmospheric pressure, and
   (h) detachable closure means on said pressure equalizer chamber means for permitting the removal and replacement of said perforated baffle plate means after the pressure in said pressure equalizer chamber means has been lowered to atmospheric pressure by said pressure relief means.

9. A steam quality equalizing baffle system for equal manifold distribution of high pressure steam in steam flood operations comprising,
   (a) perforated baffle plate means rotatably mounted internally of a steam pipe tee joint for receiving high pressure steam entering a main inlet pipe of the tee joint for being divided into two branch outlet pipes,
   (b) steam quality determining means for each of said outlet pipes,
   (c) said perforated baffle plate means being rotatable between a position parallel to one of said branch outlet pipes and a position perpendicular to said one outlet pipe responsive to both said steam quality determining means for equalizing the quality of steam in both of said steam outlet pipes,
   (d) pressure equalizer chamber means for said steam pipe tee joint having a pressure equalizer valve means for equalizing the high pressure steam between said steam tee joint and said pressure equalizer chamber means,
   (e) baffle retracting means on said pressure equalizer chamber means,
   (f) said perforated baffle plate means being responsive to said baffle retracting means for being retracted completely out of said steam pipe tee joint into said pressure equalizer chamber means,
   (g) an elongated shaft extending from said perforated baffle plate means into said pressure equalizer chamber means,
   (h) an elongated rotatable threaded shaft means for said pressure equalizer chamber means positioned parallel and adjacent to said baffle plate shaft,
   (i) traveling block means connected between said two shafts, and
   (j) said connecting traveling block means being responsive to rotation of said elongated rotatable threaded shaft means for retracting and extending said perforated baffle plate means from and into, respectively, said steam tee joint.

10. A steam quality equalizing baffle system for equal manifold distribution of high pressure steam in steam flood operations comprising,
   (a) perforated baffle plate means rotatably mounted internally of a steam pipe tee joint for receiving high pressure steam entering a main inlet pipe of the tee joint for being divided into two branch outlet pipes,
   (b) steam quality determining means for each of said outlet pipes,
   (c) said perforated baffle plate means being rotatable between a position parallel to one of said branch outlet pipes and a position perpendicular to said one outlet pipe responsive to both said steam quality determining means for equalizing the quality of steam in both of said steam outlet pipes, (d) pressure equalizer chamber means for said steam pipe tee joint having a pressure equalizer valve means for equalizing the high pressure steam between said steam tee joint and said pressure equalizer chamber means, (e) baffle retracting means on said pressure equalizer chamber means, (f) said perforated baffle plate means being responsive to said baffle retracting means for being retracted completely out of said steam pipe tee joint into said pressure equalizer chamber means, (g) said pressure equalizer chamber means being fixedly attached to said steam pipe tee joint at any position between one position co-axial with one of said branch outlet pipes and a second position normal to said one branch outlet pipe, and (h) means on said pressure equalizer chamber means for rotating said perforated baffle plate means responsive to both of said steam quality determining means for equalizing the quality of steam in both of said branch outlet pipes.

11. A method for assembling a steam quality equalizing baffle system on a high pressure steam pipe tee joint having two branch outlet pipes comprising the steps of, (a) rotatably mounting a perforated baffle plate in the high pressure steam pipe tee joint, and (b) connecting a steam quality determining means to each of the outlet pipes so that the perforated baffle plate is rotatable responsive to both the steam quality determining means to a position equalizing the quality of steam in both of the outlet pipes.

12. A method for assembling a steam quality equalizing baffle system on a high pressure steam pipe tee joint having two branch outlet pipes comprising the steps of, (a) fixedly mounting a pressure equalizer chamber means on the high pressure steam pipe tee joint over the perforated baffle plate, (b) rotatably mounting an elongated perforated baffle plate in the pressure equalizer chamber means for positioning the perforated baffle plate at the proper angle for equalizing the quality of steam in both of the outlet pipes, and (c) connecting a steam quality determining means to each of the outlet pipes so that the perforated baffle plate is rotatably responsive to both the steam quality determining means to a position equalizing the quality of steam in both of the outlet pipes.

13. A method for assembling a steam quality equalizing baffle system on a high pressure steam pipe tee joint having two branch outlet pipes comprising the steps of, (a) rotatably mounting a perforated baffle plate in the high pressure steam pipe tee joint, (b) fixedly mounting a pressure equalizer chamber means on the high pressure steam pipe tee joint over the perforated baffle plate between a position co-axial to one of the branch outlet pipes and a position normal to the one branch outlet pipe, (c) connecting a retracting means to the perforated baffle plate for retraction thereof out of the high pressure steam pipe tee joint into the pressure equalizer chamber for subsequent work on the perforated baffle plate, and (d) connecting a steam quality determining means to each of the outlet pipes so that the perforated baffle plate is rotatably responsive to both the steam quality determining means to a position equalizing the quality of steam in both of the outlet pipes.

14. A method for assembling a steam quality equalizing baffle system on a high pressure steam pipe tee joint having two branch outlet pipes comprising the steps of, (a) rotatably mounting a perforated baffle plate in the high pressure steam pipe tee joint, (b) fixedly mounting a pressure equalizer chamber means on the high pressure steam pipe tee joint over the perforated baffle plate between a position co-axial with one of the branch outlet pipes and a position normal to the one branch outlet pipe, (c) rotatably mounting an elongated baffle plate shaft in the pressure equalizer chamber means for positioning the perforated baffle plate for equalizing the quality of steam in both of the outlet pipes, (d) rotatably mounting a threaded shaft in the pressure equalizer chamber means adjacent to the perforated baffle plate shaft, and (e) connecting the threaded shaft to the perforated baffle plate shaft with a connecting traveling block for retracting the perforated baffle plate from the high pressure steam pipe tee joint into the pressure equalizer chamber means by rotation of the threaded shaft in one direction, and for extending the perforated baffle plate by rotation of the threaded shaft in the other direction, and (f) connecting a steam quality determining means to each of the outlet pipes so that the perforated baffle plate is rotatably responsive to both the steam quality determining means to a position equalizing the quality of steam in both of the outlet pipes.

15. A method for assembling a steam quality equalizing baffle system on a high pressure steam pipe tee joint having two branch outlet pipes comprising the steps of, (a) forming a slot in the high pressure steam pipe tee joint where it is desired to mount a pressure equalizer chamber means, (b) fixedly mounting a pressure equalizer chamber means on the high pressure steam pipe tee joint over the perforated baffle plate between a position co-axial to one of the branch outlet pipes and a position normal to the one branch outlet pipe, (c) forming a second slot in the portion of the pressure equalizer chamber means contiguous with the other slot for passage of the perforated baffle plate therethrough, (d) rotatably mounting a perforated baffle plate in the high pressure steam pipe tee joint, (e) connecting a retracting means to the perforated baffle plate for retraction thereof out of the high pressure steam pipe tee joint into the pressure equalizer chamber means for subsequent work on the perforated baffle plate, (f) mounting a valve in the second slot for sealing the slot closed after retraction of the perforated baffle plate therethrough into the pressure equalizer chamber means, (g) forming detachable opening means in the pressure equalizer chamber means for removal and work on the perforated baffle plate, and (h) connecting a steam quality determining means to each of the outlet pipes so that the perforated baffle plate is rotatably responsive to both the steam quality determining means to a position equalizing the quality of steam in both of the outlet pipes.

* * * * *